July 24, 1951

A. H. RUF 2,561,711

SUN SHIELD

Filed Nov. 4, 1949

A. H. Ruf
INVENTOR

BY *Snow & Co.*

ATTORNEYS.

Patented July 24, 1951

2,561,711

UNITED STATES PATENT OFFICE 2,561,711

SUN SHIELD

Adolf H. Ruf, Ogden, Utah

Application November 4, 1949, Serial No. 125,590

2 Claims. (Cl. 296—97)

This invention relates to a sun shield designed primarily for use on baby carriages and so constructed that it may be readily and easily clamped around the front bow of a baby buggy or carriage top to protect the infant occupying the buggy or carriage, against glaring sun rays.

An important object of the invention is to provide a shield of this character having means whereby the shield is adapted for use in connection with baby buggies or carriages of various widths, the attaching hooks of the device being of the adjustable type.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing.

Figure 1:
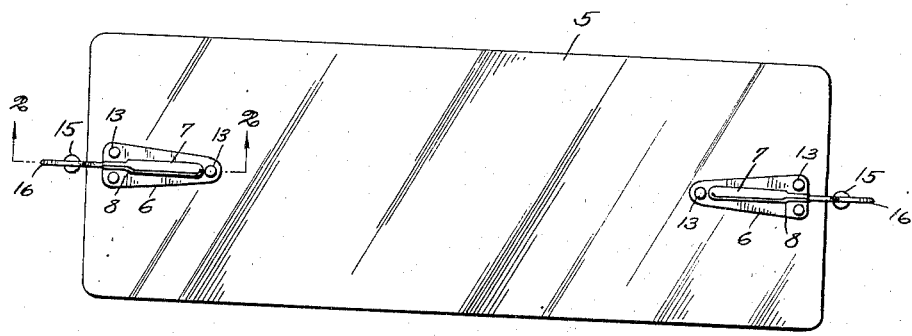
Figure 1 is a front elevational view of a sun shield, constructed in accordance with the invention.

Referring to the drawing in detail, the device comprises the body portion 5, which is constructed of flexible translucent material, or the like, the body portion providing a wide strip of Celluloid material of a length to extend across the front of the usual baby carriage top or cover, the ends of the body portion being spaced from the front bow of the buggy top.

Secured to the body portion at each end thereof, is an adjustable hook, which hook comprises a plate 6 formed with an elongated offset portion 7 extending longitudinally of the plate, the forward end of the offset portion 7 being slightly reduced, providing a shoulder 8, which constitutes a stop for the forward end of the coiled spring 9 which is shown as positioned around the shank 10 of the hook 11.

Formed on the inner end of the shank 10 is a head 12 which provides a stop for the rear end of the coiled spring 9 so that when the hook is pulled outwardly through the open end of the offset portion or housing 7, the spring 9 will be placed under tension to exert a pull on the hook to cause it to be held into close engagement on the front rib of the baby buggy top with which the shield is used.

Rivets 13 pass through openings in the plate 6 and secure the plate to the body portion 5, the body portion closing one side of the offset portion or housing 7.

Figure 2:
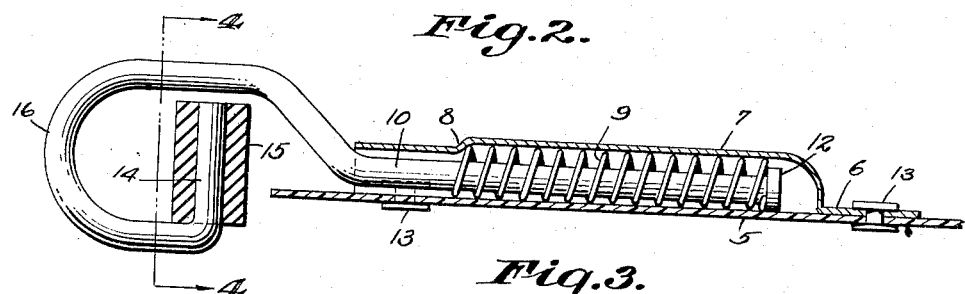
Fig. 2 is an enlarged sectional view taken on line 2—2 of Fig. 1.
Figure 3:
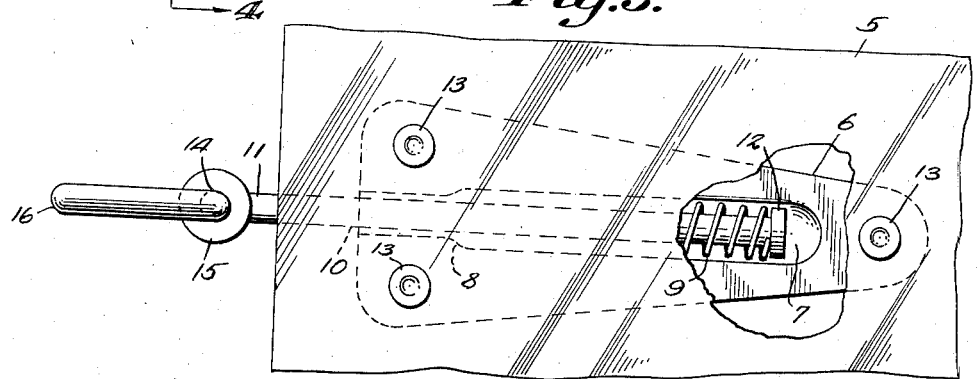
Fig. 3 is a fragmental rear elevational view of the shield illustrating the attaching hooks at one end thereof.
Figure 4:
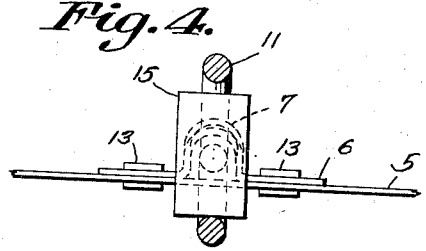
Fig. 4 is a sectional view taken on line 4—4 of Fig. 2.

As shown by Fig. 2 of the drawing, the hook 11 is formed with an end portion 14 on which the cushioning member 15 is positioned, the cushioning member 15 constituting a length of rubber formed with a central bore for positioning over the end portion 14.

This cushioning member is so arranged that it contacts with the front bow of the baby carriage at a point in direct alignment with the direction of pull exerted on the hook, by the spring 9, thereby insuring against the hooks being pulled at an angle to cause them to become accidently displaced.

The ends of the hooks are so constructed that they provide rings 16 into which the fingers of the operator may be positioned in placing the shield over the front bow of a baby carriage top.

While I have shown and described the sun shield as designed for use on baby carriages, it is to be understood that the device may be effectively employed as a sunshield for use on motor vehicle or launch wind shields, without departing from the spirit of the invention. In using the sun shield it is only necessary to pull the hooks at each end of the body portion, away from each other, tensioning the springs 9. The hooks are now in a position to slip over the forward bow of a baby carriage top. The hooks are now released to the action of the springs 9, which hold the hooks against displacement, while the shield is in use.

By again pulling the hooks away from each other, the hooks may be readily released when it is desired to discontinue the use of the sun shield.

Having thus described the invention, what is claimed is:

1. In a sun shield, a body portion constructed of translucent material, attaching means by means of which the body portion is attached to a support, said attaching means embodying a plate secured to one side of the body portion adjacent to each end thereof, each plate having an offset portion disposed longitudinally of the plate providing a recess, a shoulder formed at the end of each recess, a hook including a shank extending into the recess, a head on the inner end of the shank, a coiled spring surrounding the shank with one of its ends engaging the head, the opposite end engaging the shoulder whereby said spring is compressed upon outward movement of the shank, said hooks adapted to be positioned over the bows of a carriage top gripping the bow, the springs of the hooks urging the hooks towards each other, holding the shield in place.

2. In a sun shield, a body portion constructed of flexible translucent material, an attaching means at the ends of the body portion, the attaching means embodying a plate having a longitudinally disposed offset portion providing a recess, a shoulder formed adjacent to one end thereof, a hook including a shank having a head at its inner end disposed within the recess of each plate, a coiled spring mounted on the shanks bearing against the heads thereof normally urging the shanks inwardly, said springs engaging the shoulders holding the springs in position, and said hooks having end portions extended at right angles with respect to the axes of said shanks, cushioning members positioned on the end portions of said hooks adapted for positioning over supporting members stretching the body portion, holding the body portion in position, and rings forming a part of said hooks by means of which the shield is held when being positioned.

ADOLF H. RUF.

REFERENCES CITED

The following references are of record in the file of this patent:

UNITED STATES PATENTS

| Number | Name | Date |
|---|---|---|
| 1,478,276 | Foley | Dec. 18, 1923 |
| 2,159,870 | Wert | May 23, 1939 |
| 2,162,634 | Paine | June 13, 1939 |

FOREIGN PATENTS

| Number | Country | Date |
|---|---|---|
| 319,028 | Italy | Feb. 23, 1934 |